US012578923B2

(12) United States Patent
Tran et al.

(10) Patent No.: US 12,578,923 B2
(45) Date of Patent: Mar. 17, 2026

(54) METHOD AND APPARATUS FOR GENERATING ARCHITECTURE SPECIFIC CONVOLUTION GRADIENT KERNELS

(71) Applicant: HUAWEI TECHNOLOGIES CO., LTD., Shenzhen (CN)

(72) Inventors: Hoai Linh Tran, Markham (CA); Zichun Ye, Vancouver (CA); Giancarlo Colmenares, Markham (CA); Kai-Ting Amy Wang, Toronto (CA); Xiaoteng Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1045 days.

(21) Appl. No.: 17/689,295

(22) Filed: Mar. 8, 2022

(65) Prior Publication Data

US 2022/0188968 A1 Jun. 16, 2022

Related U.S. Application Data

(63) Continuation of application No. PCT/CN2019/105118, filed on Sep. 10, 2019.

(51) Int. Cl.
*G06F 5/00* (2006.01)
*G06F 17/15* (2006.01)
(Continued)

(52) U.S. Cl.
CPC ............... *G06F 5/00* (2013.01); *G06F 17/15* (2013.01); *G06N 3/063* (2013.01); *G06N 3/084* (2013.01);
(Continued)

(58) Field of Classification Search
CPC .......... G06N 3/04; G06N 3/045; G06N 3/048; G06N 3/0464; G06N 3/0495; G06N 3/063;
(Continued)

(56) References Cited

U.S. PATENT DOCUMENTS

2005/0060707 A1 3/2005 Tunney
2017/0323197 A1* 11/2017 Gibson .................. G06N 3/048
(Continued)

FOREIGN PATENT DOCUMENTS

CN 109190758 A 1/2019
WO 2018193906 A1 10/2018

OTHER PUBLICATIONS

Fractals are SMART: Science, Math & Art!, Fractals and Exponents, 2015, found at www.FractalFoundation.org (Year: 2015).*
(Continued)

*Primary Examiner* — Emily E Larocque

(57) ABSTRACT

A method for accelerating a convolution operation includes receiving from an I/O interface, a first data set and a second data set. Transforming the first data set into a first converted data set, the first converted data set having the first format. Transforming the second data set into a second converted data set, the second converted data set having the second format. Loading into a convolution functional unit, the first converted data set and the second converted data set, where the convolution functional unit is configured to receive a first data in a first format, to receive a second data in a second format, and to output a third data in a third format. Receiving, by the task scheduler from the convolution functional unit, a result in the third format.

20 Claims, 6 Drawing Sheets

(51) Int. Cl.
*G06N 3/063* (2023.01)
*G06N 3/084* (2023.01)

(52) U.S. Cl.
CPC .................. *G06F 2205/003* (2013.01); *G06F 2207/3812* (2013.01)

(58) Field of Classification Search
CPC .......... G06F 17/15; G06F 17/153; G06F 5/00; G06F 2205/003; G06F 2207/3812; H03M 7/00; H03M 7/02; H03M 7/04; H03M 7/06; H03M 7/08; H03M 7/14
See application file for complete search history.

(56) References Cited

U.S. PATENT DOCUMENTS

| | | | | |
|---|---|---|---|---|
| 2018/0075338 | A1 | 3/2018 | Gokmen | |
| 2018/0365561 | A1* | 12/2018 | Temam | G06N 20/00 |
| 2019/0138902 | A1* | 5/2019 | Matveev | G06N 3/04 |
| 2019/0197656 | A1 | 6/2019 | Yoda et al. | |
| 2019/0340214 | A1* | 11/2019 | Gudovskiy | G06N 3/04 |
| 2020/0184002 | A1* | 6/2020 | Sakharshete | G06F 17/16 |
| 2020/0210838 | A1* | 7/2020 | Lo | G06N 3/084 |

OTHER PUBLICATIONS

C.S. Rohwedder et al., Pooling Acceleration in the DaVinci Architecture Using Im2col and Col2im Instructions, 2021 (Year: 2021).*
Web page <http://github.com>, 5 pages, May 24, 2019, retrieved from the Wayback Machine <https://web.archive.org/web/20190524150638/https://github.com/soumith/convnet-benchmarks> on Feb. 3, 2023.
NVidia, "CUDNN 7.6.1 Developer Guide," Jun. 2019. 355 pages.
Web page <http://github.com>, 19 pages, Jan. 14, 2017, retrieved from the Wayback Machine <https://web.archive.org/web/20170114123452/https://github.com/tensorflow/tensorflow/tree/master/tensorflow/core/kernels> on Feb. 3, 2023.
Web page <http://github.com>, 19 pages, Jun. 24, 2019, retrieved from <https://github.com/tensorflow/tensorflow/blob/master/tensorflow/core/kernels/conv_grad_filter_ops.cc> on Feb. 3, 2023.
Web page <http://github.com>, 1 page, Jun. 2019, retrieved from <https://github.com/pytorch/pytorch/search?q=cudnnConvolutionBackwardData&unscoped_q=cudnnConvolutionBackwardData> on Feb. 3, 2023.
Yang Jiangping et al., "Accelerating Backward Convolution of Convolutional Neural Networks on BWDSP," 2018 9th International Symposium on Parallel Architectures, Algorithms and Programming (PAAP), IEEE, Dec. 26, 2018 (Dec. 26, 2018), pp. 163-170.

* cited by examiner

400

420

402 Task Scheduler

404

422 Interface

424 DMA

426 Img2col

428 Transformation

430 Buffer A

432 Buffer B

434 Input Register

406 Network I/F

408 I/O

410 Firmware

412 Memory/ buffers

414 DMA

416 Memory I/F

Interconnect

436 Matrix Multiply

438 Accumulate

440 Output Register

500

502

504

506

METHOD AND APPARATUS FOR GENERATING ARCHITECTURE SPECIFIC CONVOLUTION GRADIENT KERNELS

CROSS REFERENCE TO RELATED APPLICATION

This application is a continuation of International Application No. PCT/CN2019/105118 filed Sep. 10, 2019 entitled "METHOD AND APPARATUS FOR GENERATING ARCHITECTURE SPECIFIC CONVOLUTION GRADIENT KERNELS" the contents of which are incorporated herein by reference.

TECHNICAL FIELD

The present disclosure pertains to the field of neural networks and in particular to a method and apparatus for determining parameters of convolution operators used for the training of neural networks.

BACKGROUND

Convolutional neural networks (CNN) are a class of neural networks commonly used in the analysis of visual images. In CNNs, a convolution operation is applied to a data set and a set of weights. Convolution is one of the most resource-intensive mathematical operators used in modern neural networks and many efforts have been made to optimize it. There are many solutions proposed, many of which utilize popular routines such as a Fast Fourier Transform (FFT) or an image to column (Im2Col) transformation. FFTs require large amounts of memory so can be difficult to perform on systems with limited memory or memory bandwidth. On the other hand, the Im2Col routine converts a convolution into an equivalent general matrix multiplication (GEMM) based operation. This has the advantage that matrix multiplication operations have many applications and are often highly optimized for selected hardware and processor architectures.

CNNs accept sets of data inputs and associated weights. Before use, neural networks must be trained using sets of inputs and outputs. Training operations comprise a forward pass where the inputs and weights are processed, and a backwards pass where gradients are backwards processed and weights are updated.

When a neural network is the backwards pass of a training mode, an inverse of the convolution operation must be used. Since the forward pass of a convolution may utilize the Im2Col routine, the backwards pass often uses the inverse of the Im2Col routine, the column to image (Col2Im) routine. In Col2Im, gradients are scattered back from a matrix into the corresponding components of the inputs used in the forward pass. In many computing architectures, the Col2Im function comprises a large number of unoptimized vector operations which leads to slow performance. Since it can take a large number of backwards passes to train a CNN this may lead to a significant delay in the development of an optimized neural network.

There is a need for a method and apparatus for a backwards pass convolution operation that is not subject to one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present disclosure is to provide a method and apparatus for accelerating a convolution operation that may be used for the training of neural networks. In accordance with embodiments of the present disclosure, there is provided a system for accelerating a convolution operation including a task scheduler, a plurality of cores, each of the plurality of cores comprising a convolution functional unit, each of the convolution functional units configured to receive a first data in a first format, to receive a second data in a second format, and to output a third data in a third format. The system also includes an I/O interface coupled to the task scheduler and a non-transitory computer readable storage medium configured to store software instructions to control the task scheduler. The task schedule performs the steps of receiving, from the I/O interface, a first data set and a second data set. Transforming the first data set into a first converted data set, the first converted data set having the first format. Transforming the second data set into a second converted data set, the second converted data set having the second format. Loading, into the convolution functional unit, the first converted data set and the second converted data set. Receiving, from the convolution functional unit, a result in the third format.

In further embodiments, the software instructions further control the task scheduler to perform step of transforming the result into a converted result.

In further embodiments, the result is in a 5D format and the converted result is in a fractal format.

In further embodiments, the first data set is a data set of a second convolution operation, and the second data set is a propagated error of the second convolution operation of the data set and a set of weights.

In further embodiments, the first data in a 5D format, the first converted data set is in a 5D format, the second data set is in 5D format, and the second converted data set is in a fractal format.

In further embodiments, the result is a gradient with respect to the set of weights.

In further embodiments, the first data set is a set of weights of a second convolution operation, and the second data set is a propagated error of a second convolution operation of a data set and the set of weights.

In further embodiments, the first data set is in a fractal format, the first converted data set is in a fractal format, the second data set is in 5D format, and the second converted data is in a 5D format.

In further embodiments, the result is a gradient with respect to the data set.

In further embodiments, the gradient with respect to the data set is in a 5D format.

In some embodiment the system also includes a retargetable data converter, wherein the transforming the first data set into a first converted data set is performed by the vector or scalar functional units on the core running the retargetable data converter to perform the transformation.

In further embodiments, the convolution functional unit processes three dimensional matrices.

In further embodiments, the convolution functional unit performs an img2col function followed by a matrix multiplication function.

In further embodiments, the first data set and the second data set are in a tensor format.

Embodiments according to a further aspect include a method for accelerating a convolution operation. The method includes receiving, by a task scheduler from an I/O interface, a first data set and a second data set. Transforming, by the task scheduler, the first data set into a first converted data set, the first converted data set having the first format. Transforming, by the task scheduler, the second data set into a second converted data set, the second converted data set having the second format. Loading, by the task scheduler into a convolution functional unit, the first converted data set and the second converted data set, the convolution functional unit configured to receive a first data in a first format, to receive a second data in a second format, and to output a third data in a third format. Receiving, by the task scheduler from the convolution functional unit, a result in the third format.

Another aspect of the disclosure includes a method for transforming tensors. The method includes receiving an input tensor having an input format, the input format having a set of input iterators, and storing the input tensor into an input memory. Allocating an output memory to store an output tensor having an output format, the output format having a set of output iterators. Iterating over the output memory to copy an input component of the input tensor to a portion of the output memory corresponding to an output component of the output tensor, the index of the input component defined as a function of the output set of iterators.

In some embodiments, the method also includes allocating a chained memory to store a chained tensor having a chained format, the chained format having a set of chained iterators, and iterating over the chained memory to copy an output component of the output tensor to a portion of the chained memory corresponding to a chained component of the chained tensor, the index of the output component defined as a second function of the chained set of iterators.

Further embodiments include that for an output tensor, $Y[i]$, the output format is of the form (HW, 1) and the set of output iterators is i, and for an input tensor, $X[j]$, the input format is of the form (H, W) and the set of input iterators is $j_0$, $j_1$, and the function is $Y[i]=X[i/W, i \% W]$.

Further embodiments include that for an output tensor, $Y[i]$, the output format is of the form (CHW, 1) and the set of output iterators is i, and for an input tensor, $X[j]$, the input format is of the form (C, H, W) and the set of input iterators is $j_0$, $j_1$, $j_2$ and the function is $$Y[i] = X\left[\frac{i_0}{HW}, \frac{i_0}{W} \% H, i_0 \% W\right].$$

Further embodiments include that for an output tensor, $Y[i]$, the output format is of the form (H, W) and the set of output iterators is $i_0$, $i_1$ and for an input tensor, $X[j]$, the input format is of the form (HW, 1) and the set of input iterators is $j_0$, and the function is $Y[i_0, i_1]=X[i_0*W+i_1]$.

Further embodiments include that for an output tensor, $Y[i]$, the output format is of the form (C, H, W) and the set of output iterators is $i_0$, $i_1$, $i_2$, and for an input tensor, $X[j]$, the input format is of the form (CHW, 1) and the set of input iterators is $j_0$, and the function is $Y[i_0, i_1, i_2]=X[i_0*HW+i_1*W+i_2]$.

Further embodiments include that for an output tensor, $Y[i]$, the output format is of the form (H, W) and the set of output iterators is $i_0$, $i_1$, and for an input tensor, $X[j]$, the input format is of the form (H, W) and the set of input iterators is $j_0$, $j_1$, and the function is $Y[i_0, i_1]=X[H-1-i_0, W-1-i_1]$.

Further embodiments include that for an output tensor, $Y[i]$, the output format is of the form (H, W) and the set of output iterators is $i_0$, $i_1$, and for an input tensor, $X[j]$, the input format is of the form (H, W) and the set of input iterators is $j_0$, $j_1$, and the function is $Y[i]=X[i_1, i_0]$.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
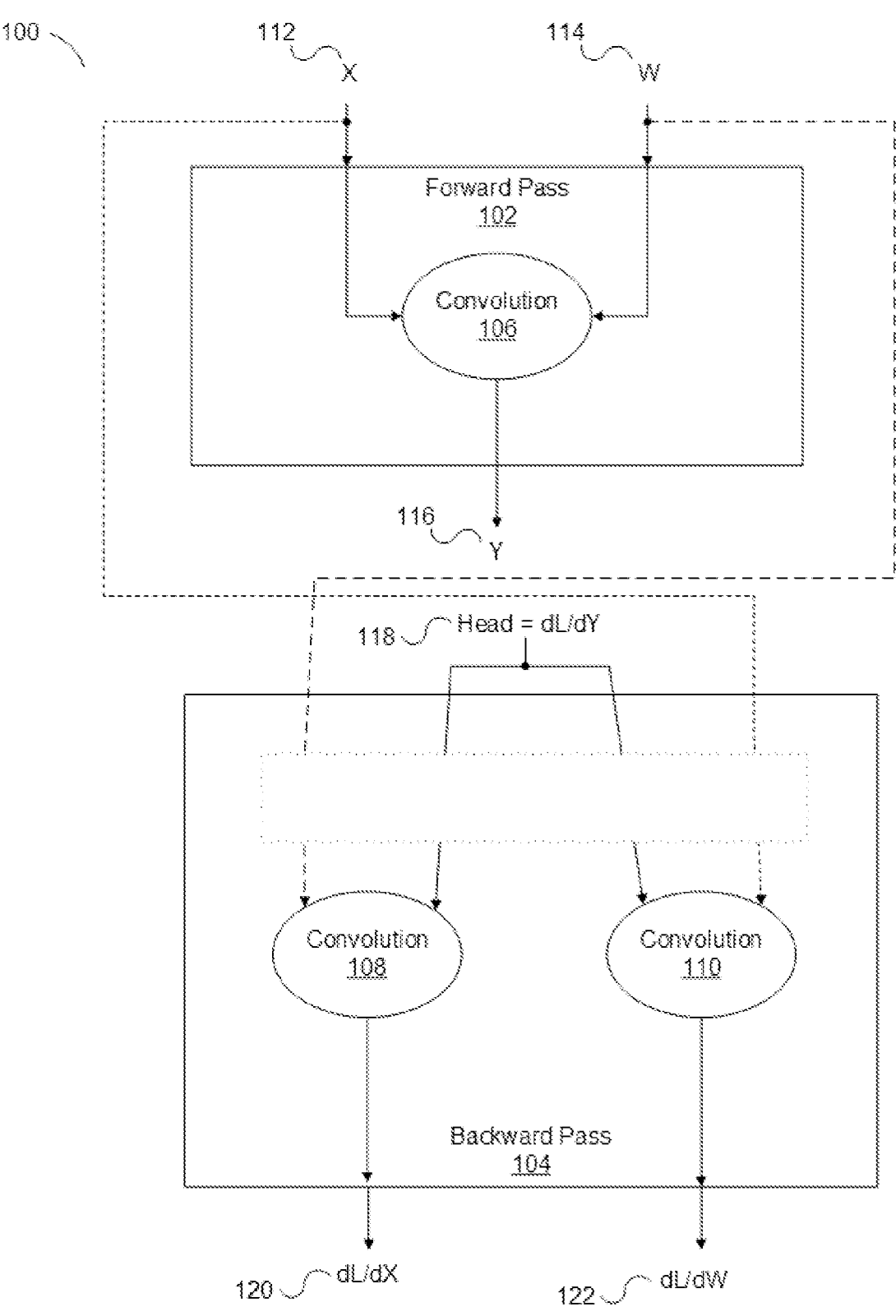
FIG. 1 illustrates a simplified view of a system for backward convolution.

Embodiments of the disclosure comprise systems and methods to accelerate convolution operations. This may take advantage of dedicated hardware such as ASICs, co-processors, cards, modules, co-processors, or similar semiconductor or electronic devices as are known in the art. Embodiments of the disclosure may be used to perform training of CNNs in AI systems.

Embodiments may be designed in various ways and, in the case of dedicated hardware resources will be designed to support a limited number of input and output formats. Common formats used in the art are referred to as 4-D (dimensional), 5-D, and fractal. For a hardware unit to process data correctly, the input data must be in the correct format. For an external computing device to interpret the output of a hardware unit correctly, it must be aware of the output format.

In embodiments that involve training of CNNs, a forward, prediction operation is performed using a set of data and weights to produce an output. Both the input data and weights will have their own format that may be determined by the source of the data. The output of the prediction operation will also have its own format. If hardware acceleration is used, the output format will be determined by the design of the hardware.

In most applications, the prediction operation involves a convolution of the data and the weights using a convolution functional unit. The convolution layer is one of the most important layers in deep neural networks. There are many ways that the convolution layer can be implemented. A common and efficient approach is converting convolution to GEMM (general matrix-matrix multiplication). This approach does an image to column (im2col) transformation to convert the image to a matrix, and then calls GEMM functions to do the actual computation. This method has been intensively optimized for performance. Some hardwires architectures and accelerators provide an im2col processor and a matrix multiplication unit to speed up the convolution.

When a CNN is trained, the gradient of the convolution is computed by a backward convolution operation which is often much less optimized compared to the forward convolution operation. The usual method of implementing the backward convolution utilizes a column to image (col2im) transformation, which is the inverse operation of im2col. The col2im is much slower than im2col as it contains additional operations and typically lacks hardware acceleration.

Embodiments of the disclosure reformat input and output data to allow for the utilization of a convolution operation to be used. In many embodiments, this convolution operation will utilize the same optimized convolution functional unit as used by the forward convolution operation described above.

The backwards pass of the CNN training process involves determining gradients of the loss with respect to (wrt) the input data and the weights given the head, the tensor of gradients of the loss wrt to the output of the forward pass operation. Embodiments reformulate this calculation to use a convolution operation that can take advantage of architectural optimizations.

The mathematical formula for 2-D data convolution of X having X.shape=(H, W) and W having W.shape=($k_h$, $k_w$) is given for the case of no padding or dilation, and where the strides are ($s_h$, $s_w$)) is given by:

$$\mathrm{Conv}(X,W)(i,j)=Y_{ij}=\Sigma_{h=0}^{k_h-1}\Sigma_{w=0}^{k_w-1}X(i\!*\!s_h\!+\!h, j\!*\!s_w\!+\!w)\!*\!W(h,w) \qquad (1)$$

The gradient of the output wrt the data input is given by:

$$\frac{\partial Y_{ij}}{\partial X_{\alpha\beta}}=\sum_h\sum_w\frac{\partial X(i*s_h+h,\,j*s_w+w)}{\partial X_{\alpha\beta}}*W(h,w) \qquad (2)$$

and the gradient of the output wrt. the weight input is given by:

$$\frac{\partial Y_{ij}}{\partial W_{\alpha\beta}}=\sum_h\sum_w X(i*s_h+h,\,j*s_w+w)\frac{\partial W_{hw}}{\partial W_{\alpha\beta}} \qquad (3)$$

The two formulas (2) and (3) allow the presentation of the backward gradient of the loss function wrt. the input data and weights as:

$$\begin{cases} \dfrac{dL}{dx} & = & Conv(\text{Padding (Strided (Head)}, [k_h-1, k_w-1]), Rot_{180}(W)) \\[2ex] \dfrac{dL}{dW} & = & Conv(X, \text{Strided (Head)}) \end{cases} \qquad (4a)$$

or in the form with separated parameters of padding, stride and dilation, as:

$$\begin{cases} \dfrac{dL}{dx} & = & Conv(\text{Strided (Head)}, Rot_{180}(W)\,|\,p=[k_h-1,k_w-1], s=1, d=1) \\[2ex] \dfrac{dL}{dW} & = & Conv(X, \text{Strided (Head)}\,|\,p=0, s=1, d=1) \end{cases} \qquad (4b)$$

where: Head is the tensor of gradients of the loss wrt. to the output $$Head_{ij}=\frac{dL}{dY_{ij}},$$

Strided(Head) is achieved by inserting $s_h-1$ zero columns between each columns of the Head, and inserting $s_w-1$ zero rows between each row of the Head, $Rot_{180}(W)$ is the input weight tensor flipped 180° (or $Rot_{180}(W)_{ij}=W_{k_h-i,k_w-1,j}$).

For 4-D data layout, where X has the shape of X(N, $C_{in}$, H, W) and W has W ($C_{out}$, $C_{in}$, $k_h$, $k_w$), the forward convolution is given by:

$$\mathrm{Conv}(X,W)(n,c,i,j)=\Sigma_{i=0}^{C_{in}}\Sigma_{h=0}^{k_h-1}\Sigma_{w=0}^{k_w-1}X(n,l,i\!*\!s_h\!+\!h,j\!*\!s_w\!+\!w)\!*\!W(c,l,h,w) \qquad (5)$$

And the two backward gradients are therefore:

$$\begin{cases} \dfrac{dL}{dX} & = & Conv2D(\text{Strided (Head)}, FlipRot(W)\,|\,p=[k_h-1, k_w-1], s=1, d=1) \\[2ex] \dfrac{dL}{dW} & = & T_{NC}(Conv2D(T_{NC}(X), T_{NC}(\text{Strided (Head)}))) \end{cases} \qquad (6)$$

where: FlipRot(W): flip the tensor W in H and W dimensions and transpose in N and C dimensions, Strided(Head): stretching the Head tensor only in H and W dimensions as above, and $T_{NC}(X)$: transposing the N and C dimensions of the tensor x.

The gradient for weights can be further simplified with the use of the dilation parameter:

$$\text{Conv}(T_{NC}(X), T_{NC}(\text{Strided}(\text{Head}))) = \text{Conv}(T_{NC}(X), T_{NC}(\text{Head}), \text{dilation}=s_{forward})$$

In the case of stride >1 and dilation >1, the final formulas becomes:

$$\begin{cases} \dfrac{dL}{dX} = & \text{Conv}(\text{Strided } (\text{Head}), \textit{FlipRot} (W) \mid p = [(k_h - 1) \cdot d_h, (k_w - 1) \cdot d_w], s = 1, d = (d_h, d_w)) \\ \dfrac{dL}{dW} = & T_{NC}(\text{Conv2D}(T_{NC}(X), T_{NC}(\text{Head}) \mid s = (d_h, d_w), d = (s_h, s_w))) \end{cases} \quad (7)$$

For Tensor processor with fractal data format, the convolution has the requirement that the input data tensor has to be in 5D $NC_1HWC_0$ format, and the input weight tensor has to be in the Fractal $(C_1HW)N_1N_0C_0$ format where:

$$\begin{cases} C \rightarrow (C_1, C_0) = \left(\dfrac{C}{\text{block\_size}}, C \text{ \% block\_size}\right) \\ N \rightarrow (N_1, N_0) = \left(\dfrac{N}{\text{block\_size}}, N \text{ \% block\_size}\right) \end{cases} \quad (8)$$

with: '//' is the integer division, '%' is the integer modulo.

FIG. 1 illustrates a simplified system for performing backward convolution operations 104 used in training a CNN system. In this illustration, the backward convolution has 3 inputs: Head 118 is the gradient of the error (or loss) wrt. the output y 116 of the forward convolution 106, the data X 112, and the weights W 114 used in the forward. The backward convolution has to generate two gradients, one wrt. the data input X 120 (denoted as dL/dX), the other wrt. the weights input W 122 (denoted as dL/dX). Additionally, some tensor processors with fractal data formats require that the data and the output are in 5D format and the weights are in fractal data formats.

Figure 2:
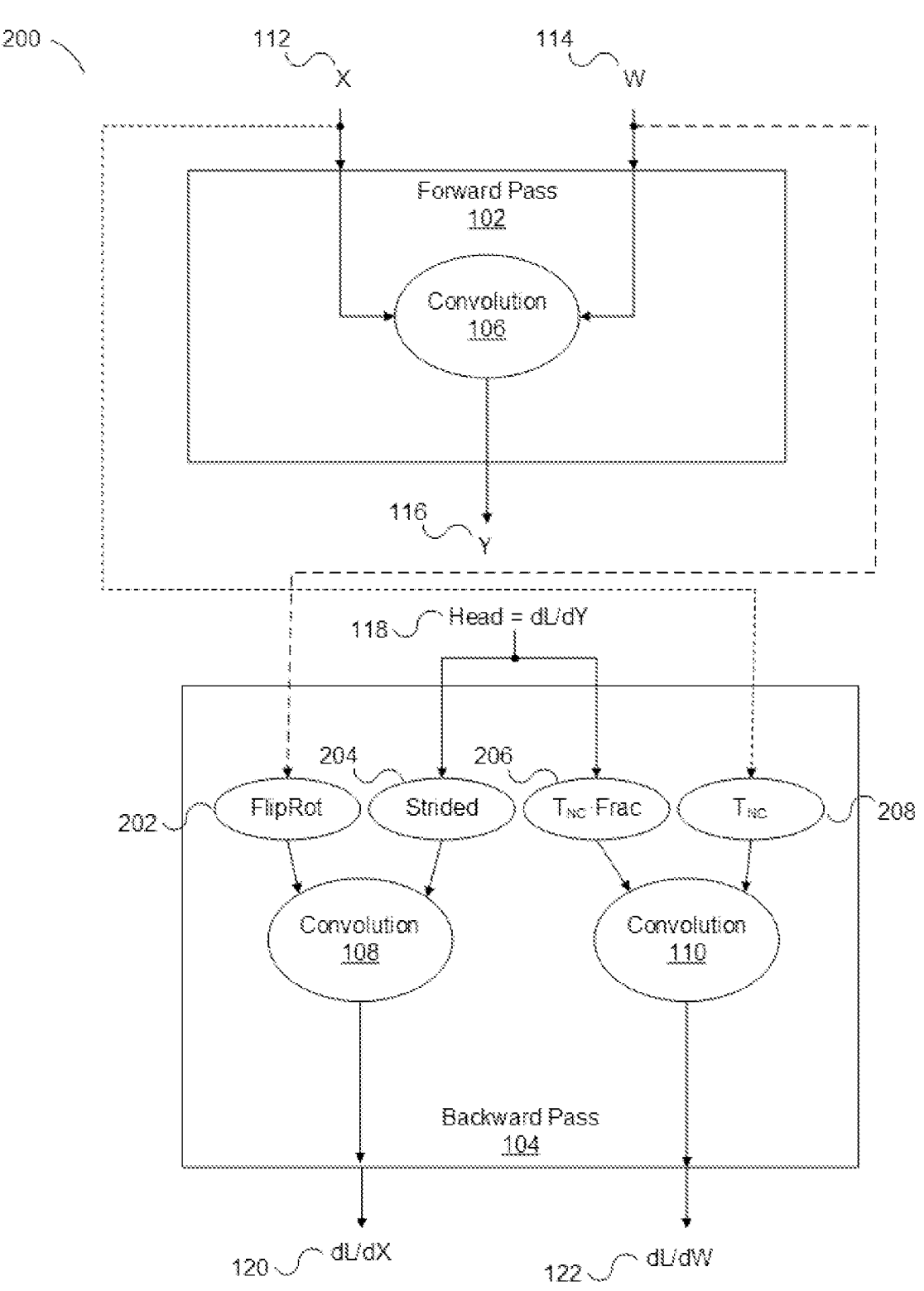
FIG. 2 illustrates a system for backwards convolution with a data format required by a tensor processor with fractal data format.

Embodiments of the disclosure use two convolution operators 108 110 to calculate the gradients 120 122. At the same time, the data format requirements require the implementation of appropriate data format converters. FIG. 2 illustrates a system according to an embodiment.

Embodiments of the disclosure allow for an operation to be optimized for specific computer architectures, implementations, or input and output data formats. For example, some embodiments may be optimized for tensor processors and fractal data layouts.

The optimization process starts by determining if an operator is a 2D convolution operator by checking its formulas and attributes. Then two new Conv2D ops may be constructed for the backward gradients of input data and input weights.

Examples of operators used in some embodiments include the following four supporting operators: FlipRot(X), Strided (X), $T_{NC}(X)$ and $T_{NC_{Frac}}(X)$ as shown in FIG. 2.

Embodiments can also use intermediate or temporary data formats. Data format conversions can be first expressed as a chain of multiple format transformations and later combined to a final, compound transformation. In some embodiments temporary data formats such as a 4D format, NCHW, and a 6D format, $N_1N_0C_1C_0HW$ may be used.

In embodiments, the data conversions may be expressed using tensors iterators as follows:

If X.shape=(H,W), Y.shape=(H,W) and $X_{ij}=Y_{ij}$ then $$i_X = i_Y; j_X = j_Y$$

The example of flipping a tensor $X_{ij} = Y_{H-1-i, W-1-j}$ can be written as:

$$i_X = H - 1 - i_Y; j_X = W - 1 - j_Y$$

With these notations, specific data converters can be determined as follows.

For transformation Strided(X), the input tensor and the result need both be in 5D formats. The 5-D format of X with corresponding iterators is:

$$\left(N, \frac{C}{16_a}, H, W, 16_a\right) \rightarrow [i_0, i_1, i_2, i_3, i_4]$$

The 5-D format of $X_{strided}$ with corresponding iterators is:

$$\left(N, \frac{C}{16_a}, (H-1)*s_h + 1, (W-1)*s_w + 1, 16_a\right) \rightarrow [j_0, j_1, j_2, j_3, j_4]$$

The relationships between the tensors using their respective iterators is:

$$X_{strided}(j_0, j_1, j_2, j_3, j_4) =$$

$$\begin{cases} 0 & \text{if } (i_2 \text{ \% } s_h! = 0) \text{ or } (j_3 \text{ \% } s_w! = 0) \\ X\left(j_0, j_1, \dfrac{j_2}{s_h}, \dfrac{j_3}{s_w}, j_4\right) & \text{otherwise} \end{cases}$$

The corresponding code may be generated in domain specific computer languages such as TVM:

```
# X in 5D format; result in 5D format
def strided_head (X, s_h, s_w):
    n, c1, h, w, c0 = X.shape
    out_shape = (n, c1, (h - 1) * s_h + 1, (w - 1) * s_w + 1, c0)
    X_strided = tvm.compute(out_shape, lambda j0, j1, j2, j3, j4:
        tvm.expr.Select(tvm.any(j2 % s_h != 0, j3 % s_w != 0),
        tvm.const(0.0, dtype="float16"),
        X[j0, j1, j2 // s_h, j3 // s_w, j4]),
        name=X.name+"_strided")
    return H_strided
```

For transformation FlipRot(X), the tensor X is in fractal format, and the transformation may be determined using the temporary steps chained together. First data in the fractal format is transformed to the NCHW format. Subsequently, the Flip transformation is applied to convert the NCHW formatted data to a fractal format. Given an original tensor X in NCHW format, its shape and corresponding iterators can be denotes as:

$$(N, C, H, W) \rightarrow [i_0, i_1, i_2, i_3]$$

Converting X into a temporary 6-D tiled tensor of shape $$x_{6D}\left(\frac{N}{16_a}, 16_a, \frac{c}{16_b}, 16_b, H, W\right).$$

Its iterators may be denoted as $[j_0, j_1, j_2, j_3, j_4, j_5]$ and $$
\begin{cases}
j_0 &= \dfrac{i_0}{16_a} \\
j_1 &= i_0 \% 16_a \\
j_2 &= \dfrac{i_1}{16_b} \\
j_3 &= i_1 \% 16_b \\
j_4 &= i_2 \\
j_5 &= i_3
\end{cases}
$$

Converting to fractal format $$X_{fractal}\left(\frac{C}{16_b} * H * W, \frac{N}{16_a}, 16_a, 16_b\right)$$

(with corresponding iterators) $[l_0, l_1, l_2, l_3]$ produces:

$$
\begin{cases}
l_0 &= [(j_2 * k_H) + j_4] * k_W + j_5 &= \left[\left(\dfrac{i_1}{16_b} * k_H\right) + i_2\right] * k_W + i_3 \\
l_1 &= j_0 &= \dfrac{i_0}{16_a} \\
l_2 &= j_1 &= i_0 \% 16_a \\
l_3 &= j_3 &= i_1 \% 16_b
\end{cases}
$$

Applying the Flip transformation to a tensor in NCHW format $X \rightarrow X_{flip}(C,N,H,W):[\tilde{i}_0,\tilde{i}_1,\tilde{i}_2,\tilde{i}_3]$ $$
\begin{cases}
\tilde{i}_0 &= i_1 \\
\tilde{i}_1 &= i_0 \\
\tilde{i}_2 &= (k_H - 1) - i_2 \\
\tilde{i}_3 &= (k_W - 1) - i_3
\end{cases}
$$

After flipping the result may be transformed into fractal format $$X_{flip-fractal}\left(\frac{N}{16_a} * H * W, \frac{C}{16_b}, 16_b, 16_a\right):[\tilde{l}_0, \tilde{l}_1, \tilde{l}_2, \tilde{l}_3],$$

and a similar dependency as above is obtained. Finally, to have the formula for FlipRot(X) from fractal to fractal format, the two transformations are chained so that $[\tilde{l}_0, \tilde{l}_1, \tilde{l}_2, \tilde{l}_3]$ are rewritten as functions of $[l_0, l_1, l_2, l_3]$ as:

$$
\begin{cases}
\tilde{l}_0 &= l_1 * k_{HW} + k_{HW} - 1 - l_0 \% k_{HW} \\
\tilde{l}_1 &= \dfrac{l_0}{k_{HW}} \\
\tilde{l}_2 &= l_3 \\
\tilde{l}_3 &= l_2
\end{cases}
$$

where $k_{HW} \triangleq H*W$.

In this case the formula for rewriting $[l_0, l_1, l_2, l_3]$ as functions of $[\tilde{l}_0, \tilde{l}_1, \tilde{l}_2, \tilde{l}_3]$ is analogical due to symmetry.

The corresponding code in TVM is:

```
# X in Fractal format; result in Fractal format
def flip weight (X, k_c, k_hw, const_shift):
    out_shape = (X.shape[1].value * k_hw, k_c // block_size,
        block_size, block_size)
    X_flip = tvm.compute(out_shape, lambda i0, i1, i2, i3:
        X[i1 * k_hw + const_shift - i0 % k_hw, i0 // k_hw,
        i3, i2],
            name=X.name+"_flipped")
    return X_flip
```

For transformation $T_{NC}(X)$, the input tensor X is in 5D format. The tensor X may be expressed in a NCHW format with corresponding iterators:

$$(N,C,H,W) \rightarrow [i_0, i_1, i_2, i_3]$$

The 5-D format of X with corresponding iterators is:

$$\left(N, \frac{C}{16_a}, H, W, 16_a\right) \rightarrow [j_0, j_1, j_2, j_3, j_4]$$

and $$
\begin{cases}
j_0 &= i_0 \\
j_1 &= \dfrac{i_1}{16_a} \\
j_2 &= i_2 \\
j_3 &= i_3 \\
j_4 &= i_1 \% 16_a
\end{cases}
$$

The N and C dimensions of X may be transposed by swapping the corresponding iterators:

$$(C,N,H,W) \rightarrow [i_1, i_0, i_2, i_3]$$

Then the result in 5-D format is $$\left(C, \frac{N}{16_b}, H, W, 16_b\right) \rightarrow [k_0, k_1, k_2, k_3, k_4]$$

with:

$$
\begin{cases}
k_0 &= i_1 \\
k_1 &= \dfrac{i_0}{16_b} \\
k_2 &= i_2 \\
k_3 &= i_3 \\
k_4 &= i_0 \% 16_b
\end{cases}
$$

The $T_{NC}(X)$ transformation from 5D to 5D format can be determined by writing $[j_0, j_1, j_2, j_3, j_4]$ as functions of $[k_0, k_1, k_2, k_3, k_4]$:

$$\begin{cases} j_0 & = & i_0 & = & k_1 * 16_b + k_4 \\ j_1 & = & \dfrac{i_1}{16_a} & = & \dfrac{k_0}{16_a} \\ j_2 & = & i_2 & = & k_2 \\ j_3 & = & i_3 & = & k_3 \\ j_4 & = & i_1 \ \% \ 16_a & = & k_0 \ \% \ 16_b \end{cases}$$

The formula for writing $[k_0, k_1, k_2, k_3, k_4]$ as functions of $[j_0, j_1, j_2, j_3, j_4]$ is analogical due to symmetry.

The corresponding implementation in TVM is:

```
# X in 5D format; result in 5D format
def transpose_data(X) :
    out_shape = (X.shape[1].value * block_size,
    X.shape[0].value // block_size,
        X.shape[2].value, X.shape[3].value, block_size)
    X_transpose = tvm.compute(out_shape, lambda j0, j1, j2,
    j3, j4:
        X[j1 * block_size + j4, j0 / block_size, j2, j3, j0
        % block_size],
            name=X.name+"_transposed")
    return X_transpose
```

For transformation $T_{NC}\cdot\text{Frac}(X)$ can be determined similarly to produce a formula for transposing N and C for $$X_{SD}\left(N, \frac{C}{16_a}, H, W, 16_a\right) \rightarrow [j_0, j_1, j_2, j_3, j_4]$$

while converting to fractal format $$x_{NC_{frac}}\left(\frac{N}{16_b} \cdot H \cdot W, \frac{C}{16_a}, 16_a, 16_b\right) \rightarrow [k_0, k_1, k_2, k_3]$$

as:

$$\begin{cases} j_0 & = & i_0 & = & \dfrac{k_0}{HW} * 16_b + k_3 \\ j_1 & = & \dfrac{i_1}{16_a} & = & k_1 \\ j_2 & = & i_2 & = & \dfrac{k_0}{W} - \dfrac{k_0}{HW} * H \\ j_3 & = & i_3 & = & k_0 \ \% \ W \\ j_4 & = & i_1 \ \% \ 16_a & = & k_2 \end{cases}$$

The corresponding implementation in TVM is:

```
def transpose_convert(X):
    out_shape = ((X.shape[0].value // block_size) *
    X.shape[2].value *
        Xshape[3].value, X.shape[1].value, block_size,
        block_size)
    W = X.shape[3].value
    HW = X.shape[2].value * X.shape[3].value
    X_transpose_convert = tvm.compute(out_shape, lambda k0,
    k1, k2, k3:
        X[k0 // HW * block_sise + k3, k1, k0 //W - (k0 //
        HW) * H, k0 % W, k2],
            name=X.name+"_transposed_convert")
    return X_transpose_convert
```

Figure 3:
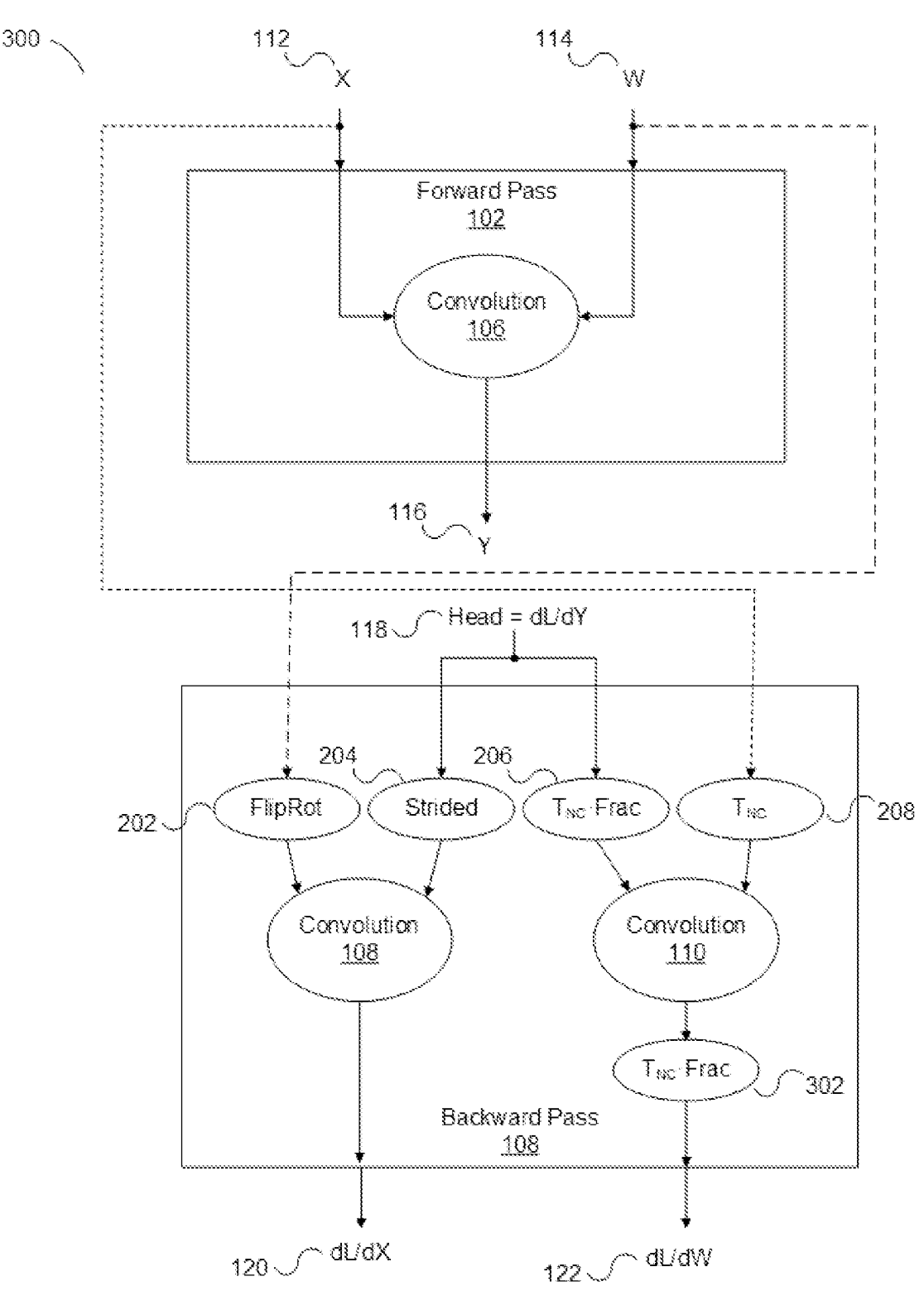
FIG. 3 illustrates a system for backwards convolution with a data format required by a tensor processor with fractal data format where a convolution operation undergoes a further transformation.

FIG. 3 illustrates an embodiment where data transformations are used to implement a backwards convolution pass when training a CNN. The gradient of the head wrt the data 120 is obtained as a convolution 108 of the weights 114 transformed by the FlipRot transformation 202 and the head 118 transformed by the Strided transformation 204. An intermediate value of the gradient of the head wrt the weights 122 is obtained as a convolution 110 of the data 112 transformed by the $T_{NC}$ transformation 208 and the head 118 transformed by the $T_{NC}\cdot\text{Frac}$ transformation 206. In this embodiment, the intermediate gradient is then transformed by the $T_{NC}\cdot\text{Frac}$ transformation 206 to produce the gradient of the head wrt the weights 122.

Embodiments of the disclosure may be used in other applications and with other frameworks where a backwards convolution may be expressed as a forward convolution.

Embodiments may use the methods of iterations to perform data conversions and transformations using the methods herein.

Figure 4:
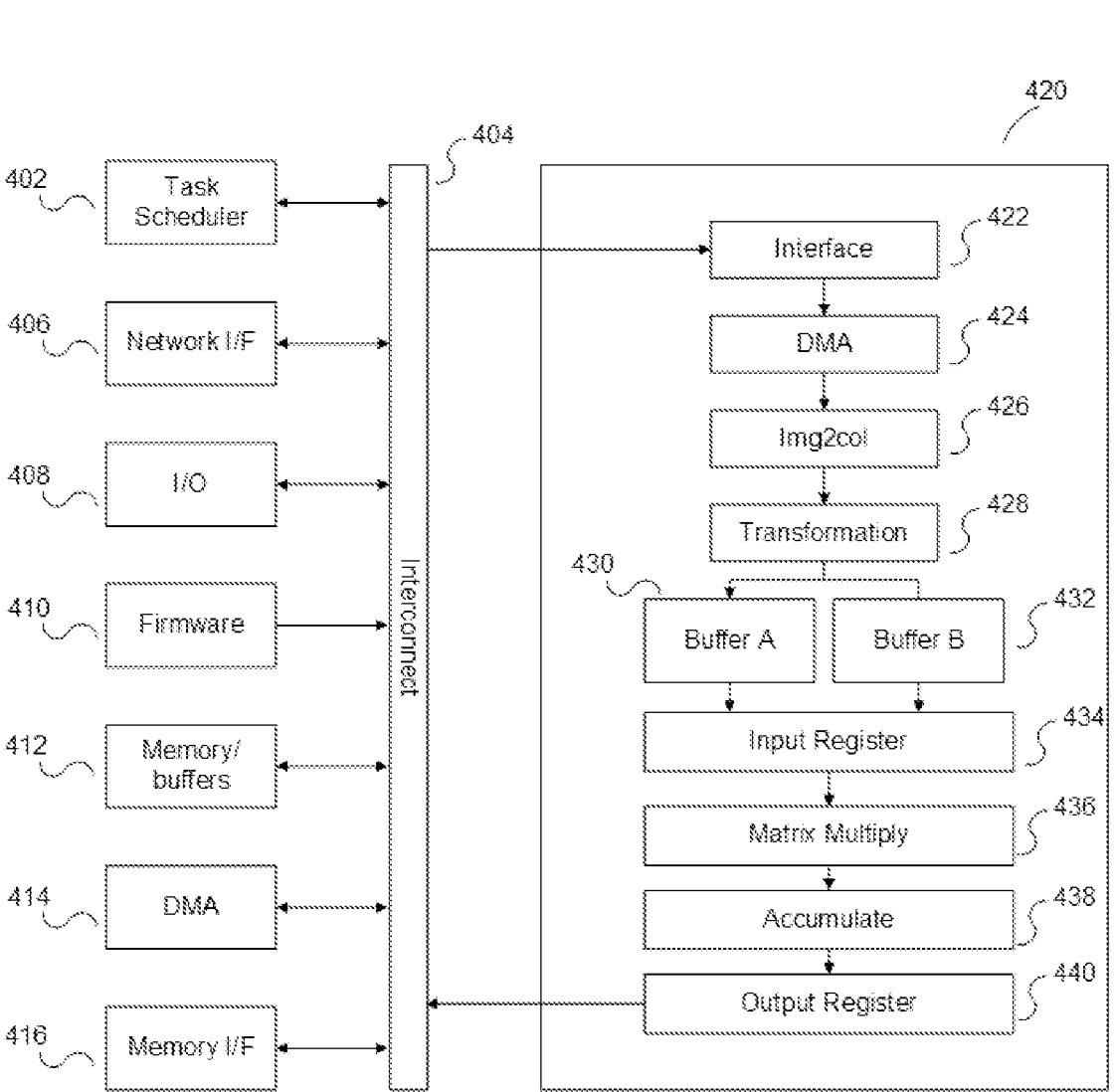
FIG. 4 illustrates a system for accelerating the execution of a backward convolution operation.

FIG. 4 illustrates an exemplary hardware implementation of a computing system 400 according to an embodiment. The computing system 400 may be a system-on-chip (SoC), a card, a module, a co-processor, and may be located internally or externally to a host system. System 400 comprises a task scheduler that supervises and controls the use of other system assets. The task scheduler may be one or more conventional CPUs that may have the same or different architectures. In some embodiment, it may also be a simplified controller or state machine. The task scheduler is coupled to an interconnect 404 that allows access to the other blocks of the system. Network I/F 406 is used to send and receive data to external or host devices and may comprise wired or wireless networking technologies such as Ethernet. It may also comprise parallel or serial bus technology such as PCI, Firewire, Thunderbolt, SATA, etc. I/O 408 is similar to the network I/F but comprise interfaces to connect to peripherals, user interface, a slow speed interfaces such as low speed USB or I²C. Firmware 410 comprises non-volatile memory storing firmware, BIOS, boot code, configuration parameters, etc. used when the system is powered on, reset, or rebooted. Memory/buffers 412 comprises internal volatile and non-volatile memory as required by the system 400. DMA 414 may be used to read, write and transfer blocks of memory within the system 400 as well as externally, with little input required from the task scheduler 402. The memory I/F 416 is used to communicate with external memory such as SRAM, DRAM, FLASH, etc.

Core 420 comprises dedicated convolution functional units to accelerate convolution operations. In some embodiments there are multiple cores. In some embodiments, the core will also contain hardware to perform data format transformation and im2col operations. Interface 422 provides an interface for the task scheduler or DMA 414 to receive data or instructions for the core 420. A DMA engine 424 may be utilized to read or write data to the core 420 from the network I/F 406, memory/buffers 412, or memory I/F 416. Before data from external sources can be used it may be required that it is transformed by transformation 428. Transformed data is copied into two buffers, A 430 and B 432, before being loaded into an input register 434. In some applications the contents of buffer A and buffer B will be the data and weights of a convolution operation. A matrix multiplication 436 unit and accumulate unit 438 are used as required to perform the convolution. Results are stored in an output register 440 for use outside of the core 420. Variations on this exemplary core 420 exist and may be customized and optimized for specific application and operations.

The convolution functional unit 420 usually has limitations on the size of the input data. The minimum input data, which is called a fractal, is usually a square matrix with a predetermined length, such as 16. The input data to the convolution functional unit 420 should be the multiply of fractals. The hardware also provides instructions for fractals, which will be more efficient than scalar and vector instructions. These factors are considered during convolution code generation.

To represent such matrix, a 4D format is used with two representing the index of the fractal, which are called the block index, and the other two representing the index of the elements inside fractals, which are called the fractal index. For example, in FIG. 5, the matrix A 502 consists 4 small fractals Ai j with 1≤i≤2 and 1≤j≤2. Each fractal Ai j is a 16 by 16 matrix {Ai jkl}1≤k, 1≤16. Here i and j are the index of the fractal, and k and l are the index of the elements inside fractals. If we want to transpose the matrix in the fractal format, we need to interchange both {i, j}, which is transposing the position of the fractal, and {k, l}, which is transposing the fractal.

1 for i, j, k, l:
2 A_transpose[i, j, k, l]=A[j, i, l, k]

Figure 5:
FIG. 5 illustrates an example of a fractal data format according to an embodiment.
Figure 5:
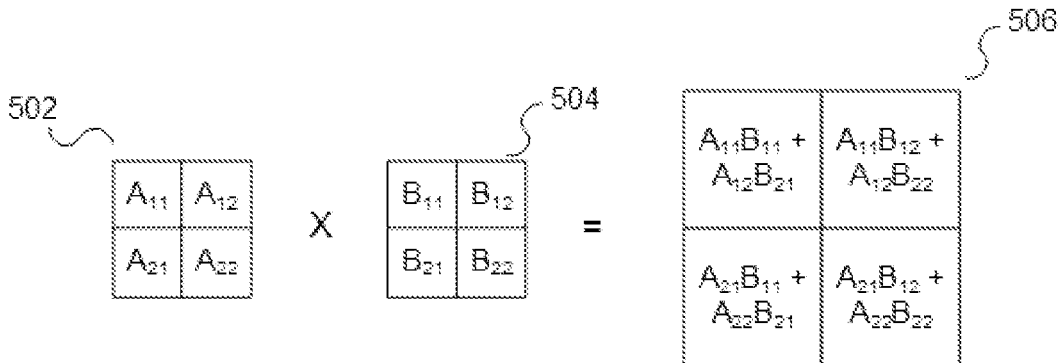

In embodiments, the convolution functional unit 420 treats the input matrix 502 as a block matrix, and each block is a fractal. The convolution is conducted via block matrix multiplication as illustrated in FIG. 5.

Figure 6:
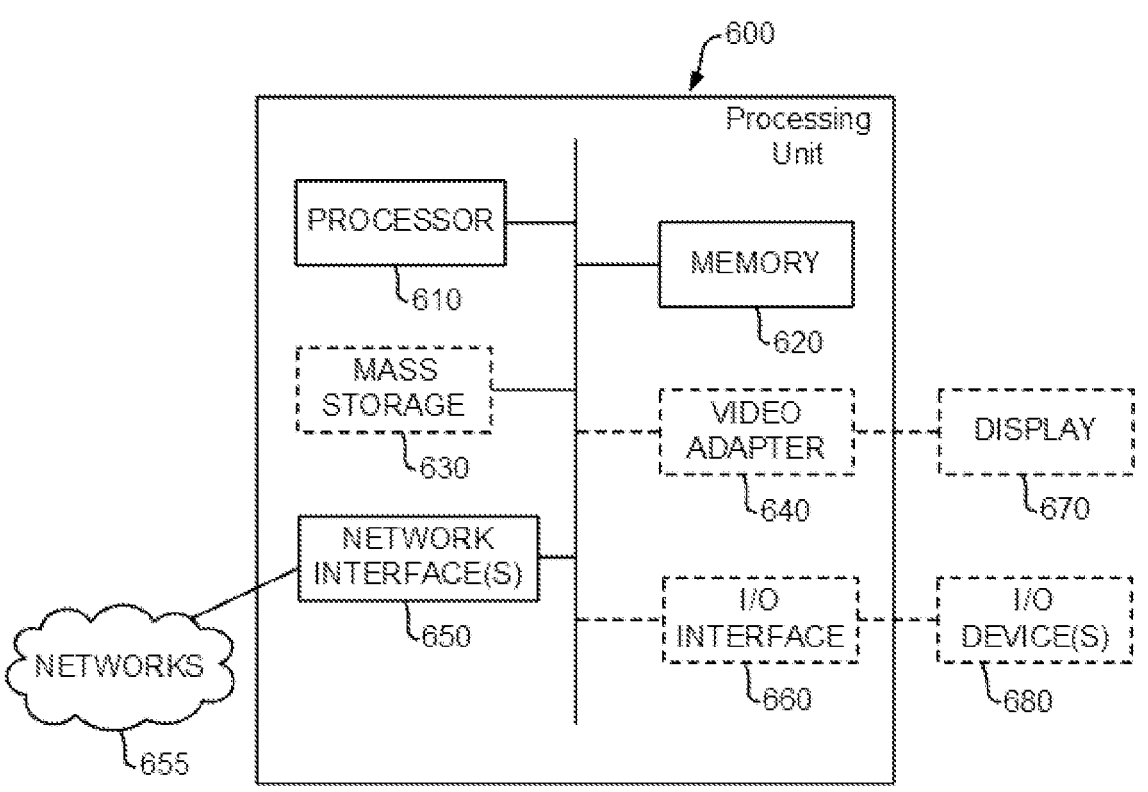
FIG. 6 illustrates configurations of a computing apparatus that may be used in or interface to embodiments.

FIG. 6 illustrates an embodiment of a general purpose computing platform that may perform the function of a host processor in a larger system or that interfaces with a coprocessor system, ASIC, card, or module that accelerates convolution operations. FIG. 4 is block diagram of a computing system that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system includes a processing unit 600. The processing unit 600 typically includes a central processing unit (CPU) 610, a bus and a memory 620, and may optionally also include a mass storage device 630, a video adapter 640, and an I/O interface 660 (each shown in dashed lines to indicate they are optional). The computing system may further include one or more network interface(s) 650 for connecting the computing system to communication networks 655.

The CPU may comprise any type of electronic data processor, and may include one or more cores or processing elements. The memory may comprise any type of non-transitory system memory such as static random access memory (SRAM), dynamic random access memory (DRAM), synchronous DRAM (SDRAM), read-only memory (ROM), or a combination thereof. In an embodiment, the memory may include ROM for use at boot-up, and DRAM for program and data storage for use while executing programs. The bus may be one or more of any type of several bus architectures including a memory bus or memory controller, a peripheral bus, or a video bus.

The mass storage may comprise any type of non-transitory storage device configured to store data, programs, and other information and to make the data, programs, and other information accessible via the bus. The mass storage may comprise, for example, one or more of a solid state drive, hard disk drive, a magnetic disk drive, or an optical disk drive.

The video adapter 640 and the I/O interface 660 provide optional interfaces to couple external input and output devices to the processing unit. Examples of input and output devices include a display 670 coupled to the video adapter 640 and an I/O device 580 such as a touch-screen coupled to the I/O interface 660. Other devices may be coupled to the processing unit, and additional or fewer interfaces may be utilized. For example, a serial interface such as Universal Serial Bus (USB) (not shown) may be used to provide an interface for an external device. Alternatively, the computing system may rely upon the network interface(s) for connection to available mass storage(s), video adapter(s), and I/O interface(s) available on the networks.

In accordance with embodiments of the present disclosure, there is provided a system for accelerating a convolution operation including a task scheduler, a plurality of cores, each of the plurality of cores comprising a convolution functional unit, each of the convolution functional units configured to receive a first data in a first format, to receive a second data in a second format, and to output a third data in a third format. The system also includes an I/O interface coupled to the task scheduler and a non-transitory computer readable storage medium configured to store software instructions to control the task scheduler. The task schedule performs the steps of receiving, from the I/O interface, a first data set and a second data set. Transforming the first data set into a first converted data set, the first converted data set having the first format. Transforming the second data set into a second converted data set, the second converted data set having the second format. Loading, into the convolution functional unit, the first converted data set and the second converted data set. Receiving, from the convolution functional unit, a result in the third format.

In further embodiments, the software instructions further control the task scheduler to perform step of transforming the result into a converted result.

In further embodiments, the result is in a 5D format and the converted result is in a fractal format.

In further embodiments, the first data set is a data set of a second convolution operation, and the second data set is a propagated error of the second convolution operation of the data set and a set of weights.

In further embodiments, the first data in a 5D format, the first converted data set is in a 5D format, the second data set is in 5D format, and the second converted data set is in a fractal format.

In further embodiments, the result is a gradient with respect to the set of weights.

In further embodiments, the first data set is a set of weights of a second convolution operation, and the second data set is a propagated error of a second convolution operation of a data set and the set of weights.

In further embodiments, the first data set is in a fractal format, the first converted data set is in a fractal format, the second data set is in 5D format, and the second converted data is in a 5D format.

In further embodiments, the result is a gradient with respect to the data set.

In further embodiments, the gradient with respect to the data set is in a 5D format.

In some embodiment the system also includes a retargetable data converter, wherein the transforming the first data set into a first converted data set is performed by the vector or scalar functional units on the core running the retargetable data converter to perform the transformation.

In further embodiments, the convolution functional unit processes three dimensional matrices.

In further embodiments, the convolution functional unit performs an img2col function followed by a matrix multiplication function.

In further embodiments, the first data set and the second data set are in a tensor format.

Embodiments according to a further aspect include a method for accelerating a convolution operation. The method includes receiving, by a task scheduler from an I/O interface, a first data set and a second data set. Transforming, by the task scheduler, the first data set into a first converted data set, the first converted data set having the first format. Transforming, by the task scheduler, the second data set into a second converted data set, the second converted data set having the second format. Loading, by the task scheduler into a convolution functional unit, the first converted data set and the second converted data set, the convolution functional unit configured to receive a first data in a first format, to receive a second data in a second format, and to output a third data in a third format. Receiving, by the task scheduler from the convolution functional unit, a result in the third format.

Another aspect of the disclosure includes a method for transforming tensors. The method includes receiving an input tensor having an input format, the input format having a set of input iterators, and storing the input tensor into an input memory. Allocating an output memory to store an output tensor having an output format, the output format having a set of output iterators. Iterating over the output memory to copy an input component of the input tensor to a portion of the output memory corresponding to an output component of the output tensor, the index of the input component defined as a function of the output set of iterators.

In some embodiment, the method also includes allocating a chained memory to store a chained tensor having a chained format, the chained format having a set of chained iterators, and iterating over the chained memory to copy an output component of the output tensor to a portion of the chained memory corresponding to a chained component of the chained tensor, the index of the output component defined as a second function of the chained set of iterators.

Further embodiments include that for an output tensor, $Y[i]$, the output format is of the form (HW, 1) and the set of output iterators is i, and for an input tensor, $X[j]$, the input format is of the form (H, W) and the set of input iterators is $j_0$, $j_1$, and the function is $Y[i]=X[i/W, i \% W]$.

Further embodiments include that for an output tensor, $Y[i]$, the output format is of the form (CHW, 1) and the set of output iterators is i, and for an input tensor, $X[j]$, the input format is of the form (C, H, W) and the set of input iterators is $j_0$, $j_1$, $j_2$ and the function is $$Y[i] = X\left[\frac{i_0}{HW}, \frac{i_0}{W}\%H, i_0\%W\right].$$

Further embodiments include that for an output tensor, $Y[i]$, the output format is of the form (H, W) and the set of output iterators is $i_0$, $i_1$ and for an input tensor, $X[j]$, the input format is of the form (HW, 1) and the set of input iterators is $j_0$, and the function is $Y[i_0, i_1]=X[i_0*W+i_1]$.

Further embodiments include that for an output tensor, $Y[i]$, the output format is of the form (C, H, W) and the set of output iterators is $i_0$, $i_1$, $i_2$, and for an input tensor, $X[j]$, the input format is of the form (CHW, 1) and the set of input iterators is $j_0$, and the function is $Y[i_0, i_1, i_2]=X[i_0*HW+i_1*W+i_2]$.

Further embodiments include that for an output tensor, $Y[i]$, the output format is of the form (H, W) and the set of output iterators is $i_0$, $i_1$, and for an input tensor, $X[j]$, the input format is of the form (H, W) and the set of input iterators is $j_0$, $j_1$, and the function is $Y[i_0, i_1]=X[H-1-i_0, W-1-i_1]$.

Further embodiments include that for an output tensor, $Y[i]$, the output format is of the form (H, W) and the set of output iterators is $i_0$, $i_1$, and for an input tensor, $X[j]$, the input format is of the form (H, W) and the set of input iterators is $j_0$, $j_1$, and the function is $Y[i]=X[i_1, i_0]$.

Unless defined otherwise, all technical and scientific terms used herein have the same meaning as commonly understood by one of ordinary skill in the art to which this disclosure belongs.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A system for accelerating a convolution operation, the system comprising:
   a task scheduler;
   a core comprising a convolution functional unit;
   an input/output (I/O) interface coupled to the task scheduler;
   a non-transitory computer readable storage medium configured to store software instructions to control the task scheduler to:
   receive, from the I/O interface, a first data set and a second data set;
   transform the first data set into a first converted data set, by applying a first tensor transformation, the first converted data set having a first format;
   transform the second data set into a second converted data set, by applying a second tensor transformation, the first tensor transformation and the second tensor transformation being applied to reformulate a same backward pass gradient calculation, the second converted data set having a second format;
   load, into the convolution functional unit of the core, the first converted data set and the second converted data set, the convolutional functional unit being configured to receive the first converted data set as an input in the first format and the second converted data set as a further input in the second format; and
   receive, from the convolution functional unit, a result of the convolution operation in a third format.

2. The system of claim 1 wherein the software instructions further control the task scheduler to transform the result into a converted result, wherein the result is in a 5-dimensional (5D) format and the converted result is in a fractal format.

3. The system of claim 1 wherein the first data set is an output data set of a second convolution operation, and the second data set is a propagated error of the second convolution operation of the output data set and a set of weights.

4. The system of claim 1 wherein the first data set is in a 5D format, the first converted data set is in a 5D format, the second data set is in 5D format, and the second converted data set is in a fractal format.

5. The system of claim 3 wherein the result is a gradient with respect to the set of weights.

6. The system of claim 1 wherein the first data set is a set of weights of a second convolution operation, and the second data set is a propagated error of a second convolution operation of a further data set and the set of weights.

7. The system of claim 6 wherein the first data set is in a fractal format, the first converted data set is in a fractal format, the second data set is in 5D format, and the second converted data set is in a 5D format.

8. The system claim 1 further comprising a retargetable data converter running on the core, the core having vector or scalar functional units, wherein the first data set is transformed into the first converted data set by the vector or scalar functional units.

9. The system of claim 1 wherein the convolution functional unit performs an image to column function followed by a matrix multiplication function.

10. A method for accelerating a convolution operation, the method comprising:

receiving, by a task scheduler from an input/output (I/O) interface, a first data set and a second data set;

transforming, by the task scheduler, the first data set into a first converted data set, by applying a first tensor transformation, the first converted data set having a first format;

transforming, by the scheduler, the second data set into a second converted data set, by applying a second tensor transformation, the first tensor transformation and the second tensor transformation being applied to reformulate a same backward pass gradient calculation, the second converted data set having a second format;

loading, by the task scheduler into a convolution functional unit of a core, the first converted data set and the second converted data set, the convolution functional unit configured to receive the first converted data set as an input in the first format and the second converted data set as a further input in the second format; and receiving, by the task scheduler from the convolution functional unit, a result of the convolution operation in a third format.

11. The method of claim 10, further comprising, transforming, by the task scheduler, the result into a converted result, wherein the result is in a 5-dimensional (5D) format and the converted result is in a fractal format.

12. The method of claim 10 wherein the first data set is an output data set of a second convolution operation, and the second data set is a propagated error of the second convolution operation of the output data set and a set of weights.

13. The method claim 10 wherein the first data set is in a 5D format, the first converted data set is in a 5D format, the second data set is in 5D format, and the second converted data set is in a fractal format.

14. The method of claim 12 wherein the result is a gradient with respect to the set of weights.

15. The method of claim 10 wherein the first data set is a set of weights of a second convolution operation, and the second data set is a propagated error of a second convolution operation of a further data set and the set of weights.

16. The method of claim 15 wherein the first data set is in a fractal format, the first converted data set is in a fractal format, the second data set is in 5D format, and the second converted data set is in a 5D format.

17. The method of claim 10, wherein the transforming the first data set into a first converted data set is performed by vector or scalar functional units on the core, the core running a retargetable data converter to perform the transformation.

18. The method of claim 10 wherein the convolution functional unit performs an image to column function followed by a matrix multiplication function.

19. A method for transforming tensors, the method comprising:

receiving an input tensor having an input format, the input format having a set of input iterators, and storing the input tensor into an input memory;

allocating an output memory to store an output tensor having an output format, the output format having a set of output iterators; and iterating over the output memory to copy an input component of the input tensor to a portion of the output memory corresponding to an output component of the output tensor, an index of the input component defined as a function of the output set of iterators.

20. The method of claim 19 further comprising:

allocating a chained memory to store a chained tensor having a chained format, the chained format having a set of chained iterators; and iterating over the chained memory to copy an output component of the output tensor a portion of the chained memory corresponding to a chained component of the chained tensor, an index of the output component defined as a second function of the chained set of iterators.

* * * * *